March 30, 1965 A. G. LONDON 3,175,582
RELEASE-RELIEF VALVE
Filed Feb. 8, 1962
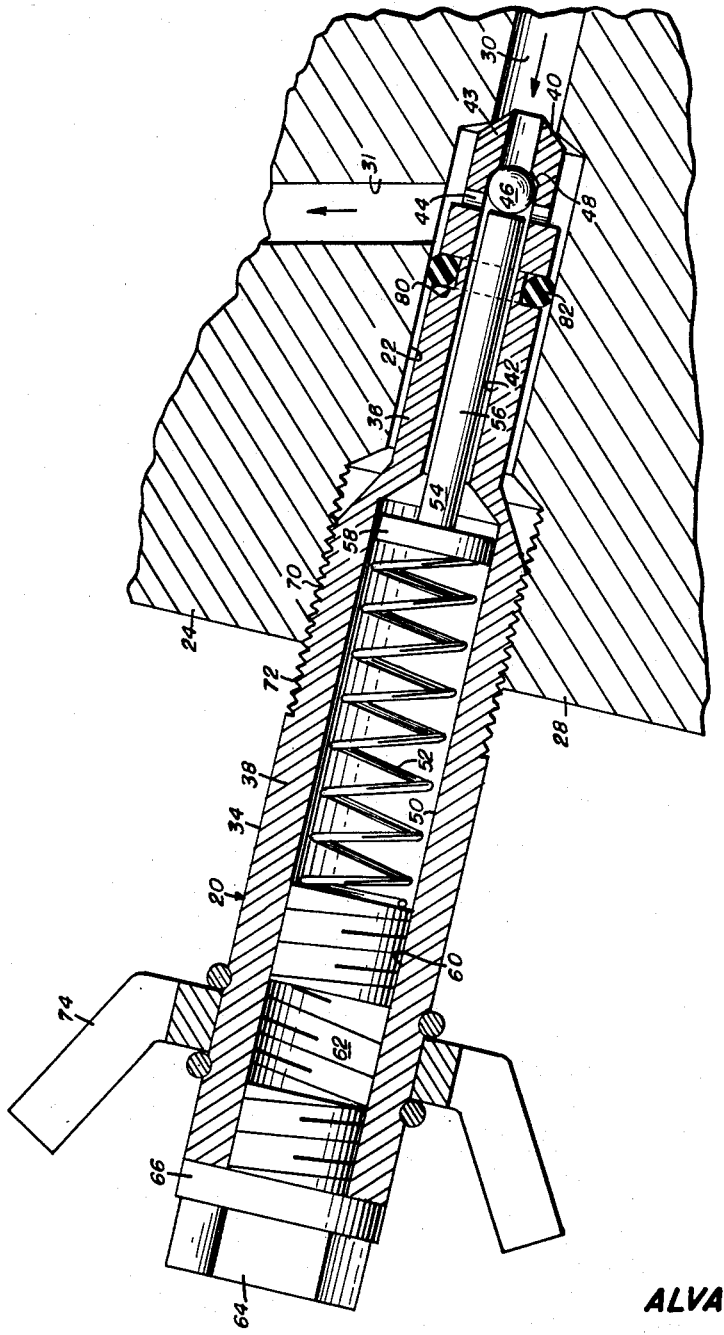
INVENTOR
ALVAN G. LONDON
BY *John J. Byrne*
ATTORNEY

United States Patent Office 3,175,582
Patented Mar. 30, 1965

3,175,582
RELEASE-RELIEF VALVE
Alvan G. London, Wauwatosa, Wis., assignor to Applied Power Industries, Inc., Milwaukee, Wis., a corporation of Wisconsin
Filed Feb. 8, 1962, Ser. No. 171,853
1 Claim. (Cl. 137—599.2)

This invention relates generally to an improvement in valves of the combined release and safety-relief type.

In the manufacture of hydraulic jacks and the like, it is conventional to provide a manually operated valve for releasing the pressure below a ram to permit the ram to return to its non-working condition, and it is oftentimes customary to provide an automatically operable relief which releases pressure from the pressurized side of the ram during pressure conditions which exceed design limitations of the jack. In some instances, such jacks are manufactured with only the manually operated release valve, without the inclusion of a safety-relief valve of any type. Oftentimes, because of the particular environment of use to which the hydraulic jack is utilized, it becomes desirable to add such a safety valve.

It is, therefore, a primary objective of this invention to provide a combination pressure and safety-relief valve utilizing common structure and capable of easy application, either during the manufacture thereof, or after the jack is in the field.

It is desirable, from several points of view, to reduce the number of bores which are required to be drilled in a hydraulic ram assemby. It is also desirable to keep the diameters of these bores to a minimum. The strength of a cylinder, or its supporting base member, is appreciably effected as a result of holes drilled therein. It is another primary objective of this invention to provide a combination release and safety valve assembly which requires only one small diameter bore to be drilled in the assembly, and said bore having a mininum cross-sectional area.

A still further objective of this invention is to provide a unique valve assembly utilizing a spring-biased elongated push rod to retain a check ball in close engagement with a valve seat so that the valve dimensions are substantially independent of the design limitations of the biasing means.

A further objective of the invention is to provide a combination release-relief check valve assembly which has improved maintenance advantages.

A still further objective of this invention is to provide exterior adjustable means for both the release and relief functions of the valve assembly.

Another important objective of the invention is to provide a valve assembly including a spring-biased check ball wherein the size of spring which one desires to use is not a major factor in determining the size of the bore required to receive the valve.

Another important object of this invention is to provide a combination release and safety valve for a hydraulic jack wherein reverse flow from the low pressure side of the arm to the normally high pressure side is permitted when either the release or safety-relief portions of the valve are adjusted.

These and other objectives and advantages of the invention will be more fully understood upon a reading of the following specifications taken in view of the attached drawings wherein:

FIGURE 1 is a cross-sectional view of the valve.

While the invention has been specifically shown and described herein as being embodied in and particularly applicable to a hydraulic jack of a particular type, the improvements are obviously advantageously applicable to hydraulic tools generally wherein a ram or piston member is actuated by hydraulic pressure built up within a displacement chamber and in which it is desired to release the pressure at the will of an operator while also providing means to relieve abnormally high pressures. It is also contemplated that certain specific descriptive terms used herein shall be given the broadest possible interpretation consistent with the disclosure.

The invention's environment of use can best be understood by a reference of the Vallee Patent 2,975,803, which issued on March 21, 1961, and is owned by the assignee of the instant invention.

Referring now particularly to the drawings wherein like numerals indicate like parts, the numeral 20 indicates the valve of this invention. The valve is adapted for insertion into a bore 22 in a base member 28 which corresponds to the base member 8 of the Vallee patent. The base member is also provided with a passageway 30 to a high pressure source of fluid, and a second passageway 31, normally leading to the other side of the piston head. The fuction of the valve is to prevent the movement of pressurized fluid for passageway 30 to passageway 31 unless it is desired to move the piston head or ram to its non-working position, or in the event pressures in excess of the designed limits of the assembly are reached in the high pressure fluid area.

The valve itself is comprised of a valve housing 34 having a reduced inner end 36 and a main housing section 38. Passageway 30, at that end in communication with bore 22, forms an annular valve seat 40 to which the tapered surface 43 of section 36 may nest. Reduced portion 36 is manufactured with a passageway 42 running the longitudinal length thereof, and an intersecting cross-bore 44.

Intermediate the length of passageway 42, and between passageway 30 and cross-bore 44, is a valve seat 48 which receives a check ball 46. Cross-bore 44 is capable of communicating the high pressure passageway 30 with the low pressure passageway 31 in the event the check ball 46 is unseated from valve seat 48.

The valve housing 38 is cylindrical in shape, and provides a relatively large chamber 50 in which a coil spring 52 is housed.

The spring 52 has as its function to bias a push rod 54 (to the right, as viewed in FIG. 1) against the check ball 46 and maintain the ball in its no-flow position during pressures lower than designed limits. The push rod consists of an elongated stem 56 and an enlarged head 58. So long as the bias force of spring 52 exceeds that of the pressure in conduit 30, check ball 46 will remain in place blocking the flow of fluid between passageways 30 and 31. In the event the pressure in 30 exceeds the limits of the assembly, it will overcome the design pressure of coil spring 52 permitting check ball 46 to become unseated and pressure will be released via cross-bore 44 to low pressure line 31.

The interior of chamber 50 is threaded at 60 to receive a threaded plug member 62 which is terminated at its outer end by a hexagon cap screw 64. Spaced between the cap screw 64 and the end 65 of the valve body is a resilient gasket 66. It is evident that the pressure necessary to overcome the check ball 46 is adjustable by rotating nut 64.

The bore 22 is interiorly threaded at 70 to receive the exterior threads 72 of the valve body 38. Spaced outwardly from the screw 72 is a wing lever 74 by which the valve body can readily be screwed to positions wherein valve seat 43 is in or out of engagement with seat 40. By rotating the wing levers the valve will act as a release valve. It should be noted that the operation of the release mechanism in no way effects the operation of the relief assembly. In other words, even though seat 43 is moved to a position permitting flow therepast, the pressure necessary to overcome the bias placed on ball 46 by stem 54 will be the same. In like manner, even though the safety-relief mechanism is adjusted, or functions, it in no way effects the operation of the release structure.

An annular recess 80 about portion 36 receives an O-ring seal 82 which prevents the leakage of oil between the valve and bore 22. In the event the safety-relief mechanism functions the screw threads 60, and the gasket 66 prevent the escape of fluid.

There has been described a combination valve completely enclosed within the housing 34. Therefore, when housing 34 is removed from the base member, the entire assembly is easily cleaned or otherwise maintained. It should also be noted that, as a result of this unitary construction, a back flow of fluid is permitted between tapered surface 43 and valve seat 40. Through the use of push rod 56, the diameter of bore 22 is independent of the design limitations of spring 52. The counter bore section of the bore, defined by threads 70, can be quite shallow and presents no material difficulties to the combination.

In a general manner, while there has been disclosed in the above description, what is deemed to be the most practical and efficient embodiment of the invention, it should be well understood that the invention is not limited to such an embodiment, as there might be changes made in the arrangement, disposition, and form of the parts without departing from the principle of the present invention as comprehended within the scope of the accompanying claim.

I claim:

In combination with a ram assembly having a bore leading to a first conduit in communication with the high pressure source of said assembly and a second conduit in communication with the low pressure source of said assembly, a release-relief valve comprising an elongated housing having a reduced portion received in said bore and a hollow cylindrical portion, said reduced portion having a small diameter passage of substantial length extending therethrough with one end in communication with the interior of said hollow section and its other end in communication with said first conduit, a valve seat intermediate the length of said passage, a cross-bore between said valve seat and said interior in communication with said second conduit, a check ball normally received by said seat, a push rod slidably received in said passage and having a first end adjacent said check ball and a second end terminated by an enlarged head having a diameter larger than the diameter of said passage received in said interior, a spring in said interior biasing said rod against said ball and thereby normally maintaining said check ball in engagement with said valve seat until a pressure sufficient to overcome the bias of said spring is reached in said high pressure fluid source.

References Cited by the Examiner

UNITED STATES PATENTS

| | | | |
|---|---|---|---|
| 2,103,673 | 12/37 | Hoferer | 137—539.5 |
| 2,358,228 | 9/44 | Hoof | 137—516.25 X |
| 2,975,803 | 3/61 | Vallee | 137—599.2 |

WILLIAM F. O'DEA, *Acting Primary Examiner.*